United States Patent
Ito et al.

(10) Patent No.: US 6,530,353 B2
(45) Date of Patent: Mar. 11, 2003

(54) CRANKSHAFT HOLDING STRUCTURE FOR INTERNAL COMBUSTION ENGINE

(75) Inventors: Katsuhiko Ito, Saitama (JP); Masataka Eguchi, Saitama (JP); Kazuhiro Yasuda, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/851,338

(22) Filed: May 9, 2001

(65) Prior Publication Data

US 2002/0005184 A1 Jan. 17, 2002

(30) Foreign Application Priority Data

May 10, 2000 (JP) ............................ 2000-137676

(51) Int. Cl.[7] .............................. F02F 7/00; F02B 75/32
(52) U.S. Cl. ................................. 123/195 R; 123/197.1
(58) Field of Search ........................... 123/195, 195 H, 123/197.1, 197.4

(56) References Cited

FOREIGN PATENT DOCUMENTS

| DE | 3207325 A1 | * 9/1983 |
| JP | 62151618 A | * 7/1985 |
| JP | 60179597 | 9/1985 |
| JP | 09264156 A | * 10/1997 |

* cited by examiner

*Primary Examiner*—Willis R. Wolfe
(74) *Attorney, Agent, or Firm*—Birch, Stewart Kolasch & Birch, LLP

(57) ABSTRACT

A crankshaft holding structure 10 for use in an internal combustion engine has a front crankshaft 35 supported by a radial roller bearing 25 that is fixed to a crankcase 11 and has an inner side surface 26a. A land 40 of the front crankshaft 35 is held in abutment against the inner side surface 26a to limit crankshafts 30, 35 against axial elongation and deformation. The radial roller bearing 25 has an outside diameter D1 that is the same as an outside diameter of a radial ball bearing 20. The forgoing arrangement includes simplified bushings cast in a crankcase and having bearing press-fitted therein, that allows the bushings to be used as common parts.

14 Claims, 4 Drawing Sheets

CRANKSHAFT HOLDING STRUCTURE FOR INTERNAL COMBUSTION ENGINE

BACKGROUND OF THE INVENTION

1. Field of the Invention

The present invention relates to a crankshaft holding structure for use in an internal combustion engine, and more particularly to a crankshaft holding structure for absorbing axial elongation and deformation of a crankshaft.

2. Description of the Background Art

Crankshafts of internal combustion engines suffer from axial elongation and deformation due to thermal expansion. However, there are crankshaft holding structures for absorbing axial elongation and deformation of a crankshaft. For example, one crankshaft holding structure is shown in Japanese Patent Laid-open No. 60-179597 entitled "Crankshaft Holding Structure for Internal Combustion Engine."

This type of crankshaft holding structure includes a resilient member which is placed in a gap between an end face of a bearing and a crankcase. When a crankshaft is installed in the crankcase with bearings, the resilient member serves to absorb axial elongation and deformation of the crankshaft.

However, the resilient member required in this type of arrangement to absorb axial elongation and deformation of the crankshaft presents an obstacle to any efforts to cut down the cost of the crankshaft holding structure.

There is also a technique in the background art for absorbing axial elongation and deformation of a crankshaft without the use of a resilient member. Such a technique will be described below with reference to FIG. 4 and FIG. 5.

FIG. 4 of the accompanying drawings is a cross-sectional view of a conventional crankshaft holding structure for use in an internal combustion engine. In FIG. 4, the terms "front" and "rear" are used to indicate front and rear sides of the holding structure.

A crankshaft holding structure 60 for use in an internal combustion engine has a rear bushing 65 of cast iron that is cast in a rear wall 62 (shown in the rear side in FIG. 4) of a crankcase 61. A radial ball bearing 70 has an outer race 71 press-fitted in the rear bushing 65 and an inner race 72 with a rear crankshaft 76 interference-fitted therein.

The crankshaft holding structure 60 also has a front bushing 66 of cast iron that is cast in a front wall 63 (shown in the front side in FIG. 4) of the crankcase 61. A radial roller bearing 73 has an outer race 74 press-fitted in the front bushing 66 and an inner race 75 with a front crankshaft 77 clearance-fitted therein. A connecting rod 79 is coupled by a connecting rod pin 78 to a counterweight 76a of the rear crankshaft 76 and a counterweight 77a of the front crankshaft 77.

Since the front crankshaft 77 is clearance-fitted in the inner race 75 of the radial roller bearing 73, axial elongation and deformation of the crankshafts 76, 77 can be accommodated in the direction toward the radial roller bearing 73 as indicated by the arrow "a."

FIG. 5 of the accompanying drawings is an enlarged view of an encircled area 5 shown in FIG. 4. The counterweight 77a of the front crankshaft 77 has a land 77b confronting the front bushing 66 and spaced from an end face 66a thereof by a gap L5. The gap L5 is set to a value smaller than a gap L6 between an inner side surface 75a of the inner race 75 and a stepped wall surface 77c of the counterweight 77a.

When the elongation or deformation of the rear crankshaft 76 and the front crankshaft 77 increases, the land 77b abuts against the end face 66a of the front bushing 66 before the stepped wall surface 77c of the counterweight 77 abuts against the inner race 75 of the radial roller bearing 73. This limits crankshaft elongation and deformation due to thermal expansion of the crankshafts.

Therefore, since no axial load is applied to the inner race 75 of the radial roller bearing 73, rollers 73a of the radial roller bearing 73, for example, are prevented from being locally worn.

In order to make the gap L5 between the land 77b and the end face 66a of the front bushing 66 smaller than the gap L6, it is necessary that the front bushing 66 projects from the front wall 63 of the crankcase. Since the front bushing 66 thus projecting from the front wall 63 has an increased width W5, the front bushing 66 has a relatively larger shape.

In addition, in order to keep the land 77b in uniform abutment against the end face 66a of the front bushing 66, the end face 66a of the front bushing 66 needs to be machined in its entirety to a flat surface. However, it is time-consuming to machine the end face 66a as it is normally annular in shape. Therefore, the machining process inhibits attempts to further reduce the cost of the front bushing 66 and the crankshaft holding structure.

Furthermore, in order to satisfy the dimension of the gap L5, the extent to which the end face 66a of the front bushing 66 projects needs to fall within an allowable range. However, since the front bushing 66 is cast in the front wall 63 of the crankcase 61, dimensional errors tend to be large.

It is tedious and time-consuming to manage gap dimensions so as to keep the extent of projection of the front bushing 66 within this allowable range. The tedious and time-consuming process of dimensional management also obstructs efforts to minimize the cost of the structure.

As much as the front bushing 66 projects from the front wall 63 of the crankcase, the width W5 of the front bushing 66 is correspondingly larger. Therefore, this increase in size of the front brushing 66 virtually eliminates the ability to use the front bushing 66 and the rear bushing 65 (see FIG. 4) as common parts, e.g. interchangeably. Accordingly, it becomes necessary to manage and store different types of bushings. However, there is a demand for using the front and rear bushings as common parts that is further complicated by the aforementioned arrangement of the background art.

SUMMARY OF THE INVENTION

The present invention overcomes the shortcomings associated with the background art and achieves other advantages not realized by the background art.

It is an aspect of the present invention to provide a crankshaft holding structure for use in an internal combustion engine that includes a simplified structure.

It is an aspect of the present invention to provide a crankshaft holding structure having bushings with bearings press-fitted therein.

It is an additional aspect of the present invention to provide a crankshaft holding structure permitting bushings to be used as common parts.

These and other aspects of the present invention are accomplished by a crankshaft holding structure for an internal combustion engine, the crankshaft holding structure comprising a crankcase; a plurality of bearings including at least one radial roller bearing having an outer race, the outer race fixed to the crankcase; and a crankshaft having a side surface, the side surface of the crankshaft abutting against a side surface of the outer race of the radial roller bearing and limiting an axial elongation and a deformation of the crankshaft.

The outer face of the radial roller bearing is mounted on the crankcase so as not to be axially displaced when the side surface of the crankshaft abuts against the outer face of the radial roller bearing. In view of this arrangement, the side surface of the crankshaft is held in abutment against the side surface of the outer race of the radial roller bearing for thereby limiting axial elongation and deformation of the crankshaft. Since the outer race of the radial roller bearing is not axially displaced, rollers of the radial roller bearing are prevented from becoming locally worn.

The side surface of the outer race of the radial roller bearing against which the side surface of the crankshaft abuts is machined to a flat finish in advance. Therefore, any process of subsequently machining the side surface of the outer race to a flat finish can be dispensed with. In addition, because the radial roller bearing is press-fitted in the crankcase while being positioned highly accurately, the management of the dimensions of the side surface of the outer race is simplified.

Furthermore, since the side surface of the crankshaft is held in abutment against the side surface of the outer race of the radial roller bearing, it is not necessary to hold the side surface of the crankshaft in abutment against an end face of a bushing in which the radial roller bearing would be press-fitted, as is the case with the conventional structure. Consequently, it is not necessary to project the end face of such a bushing and machine the projecting end face to a flat finish.

These and other aspects of the present invention are accomplished by a crankshaft holding structure for an internal combustion engine, the crankshaft holding structure comprising a crankcase; a plurality of bushings having respective inner diameters, wherein the inner diameters of the bushings are equal; a plurality of bearings including at least one radial roller bearing having an outer race, the outer race press-fitted within a first bushing fixed to the crankcase; and a crankshaft having a first side surface and second side surface, the first side surface of the crankshaft abutting against a side surface of the outer race of the radial roller bearing and limiting an axial elongation and a deformation of the crankshaft.

When the outside diameters of the bearings are identical to the outside diameter of the radial roller bearing, bushings in which the bearings are press-fitted have the same diameters. Therefore, the front and rear bushings can be used as common parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
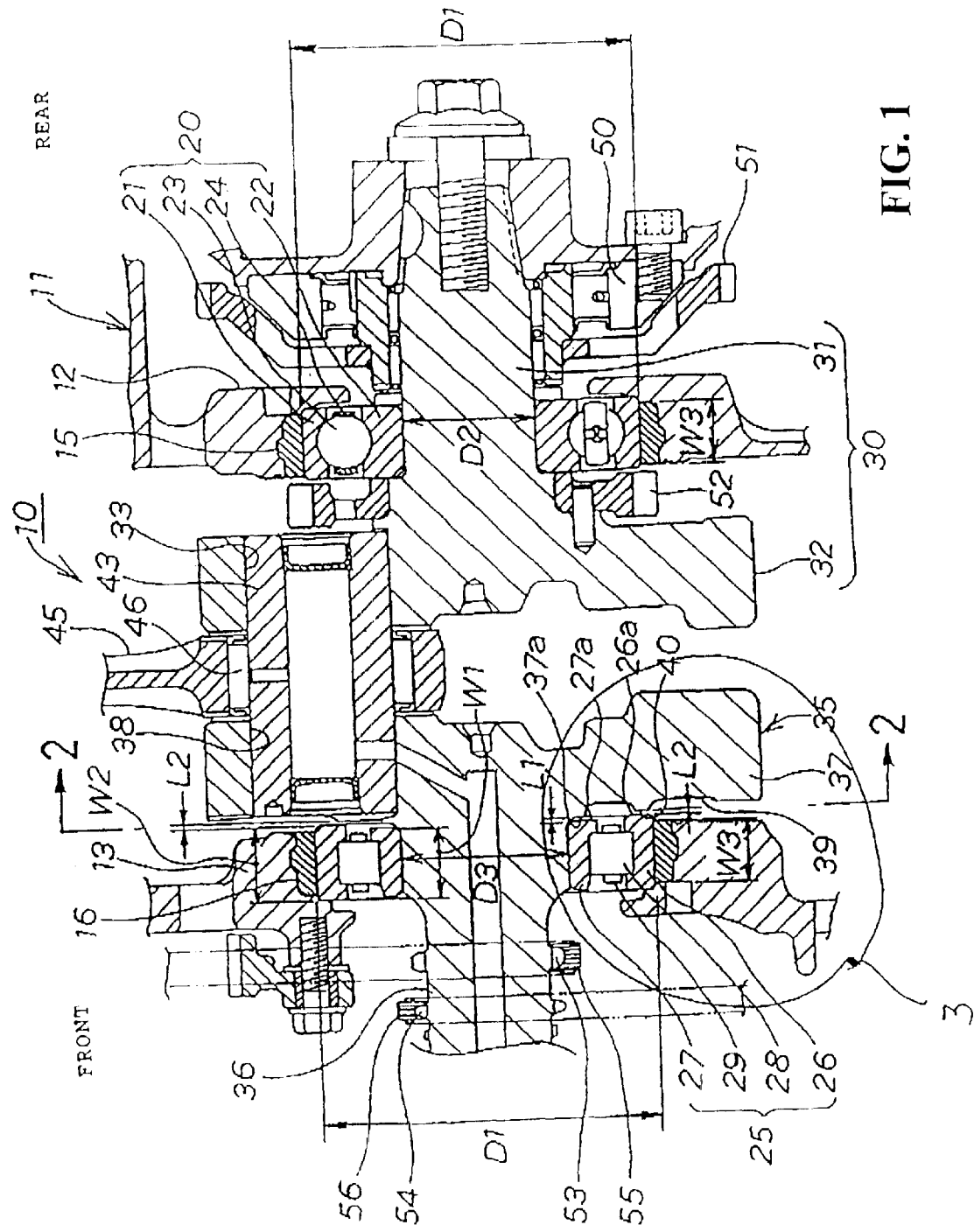
FIG. 1 is a cross-sectional view of a crankshaft holding structure for use in an internal combustion engine according to an embodiment of the present invention.
Figure 2:
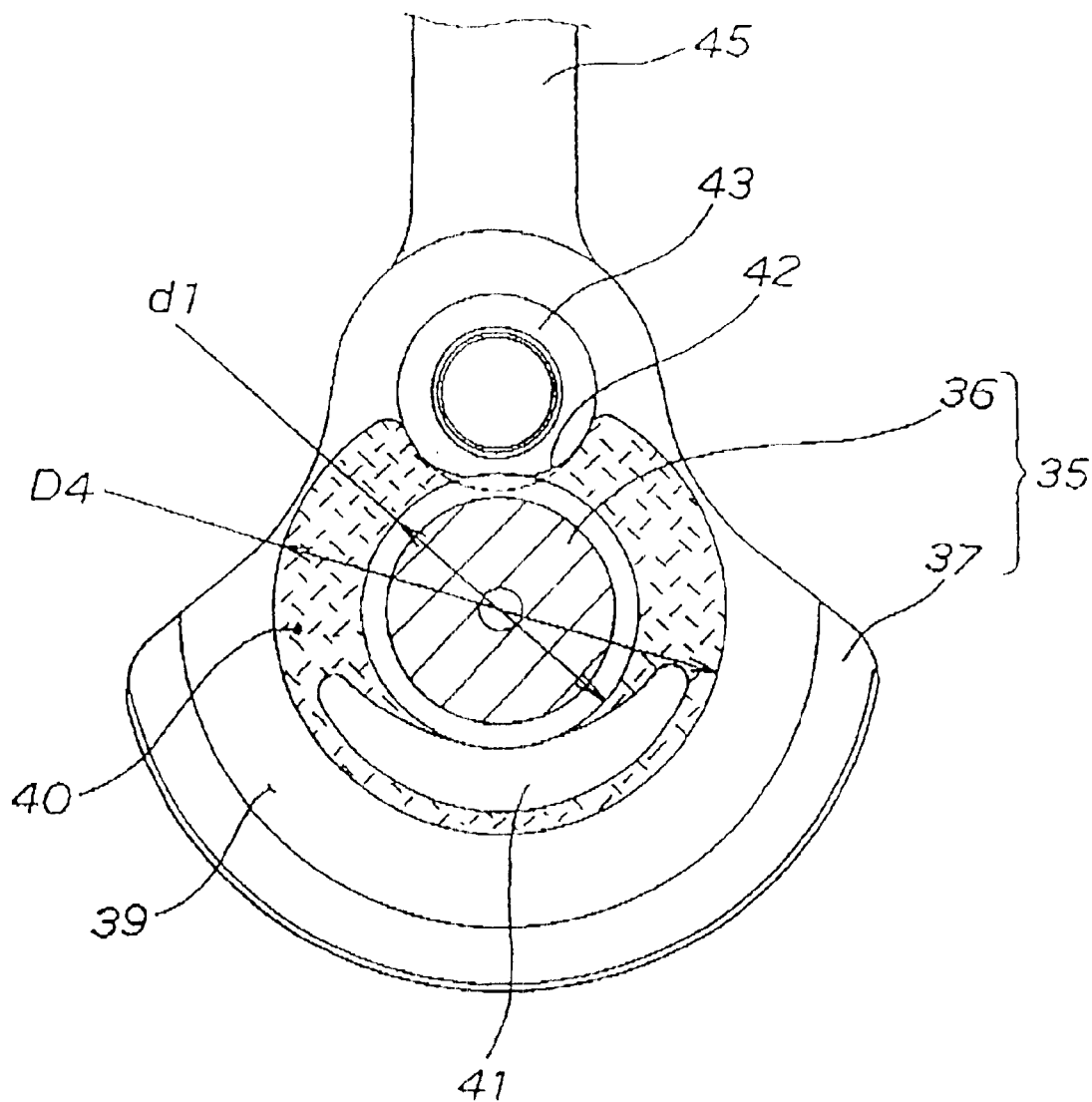
FIG. 2 is a cross-sectional view taken along line 2—2 of FIG. 1.

The present invention will hereinafter be described with reference to the accompanying drawings. FIG. 1 is a cross-sectional view of a crankshaft holding structure for use in an internal combustion engine according to an embodiment of the present invention. FIG. 2 is a cross-sectional view taken along line 2—2 of FIG. 1.

Figure 3A:
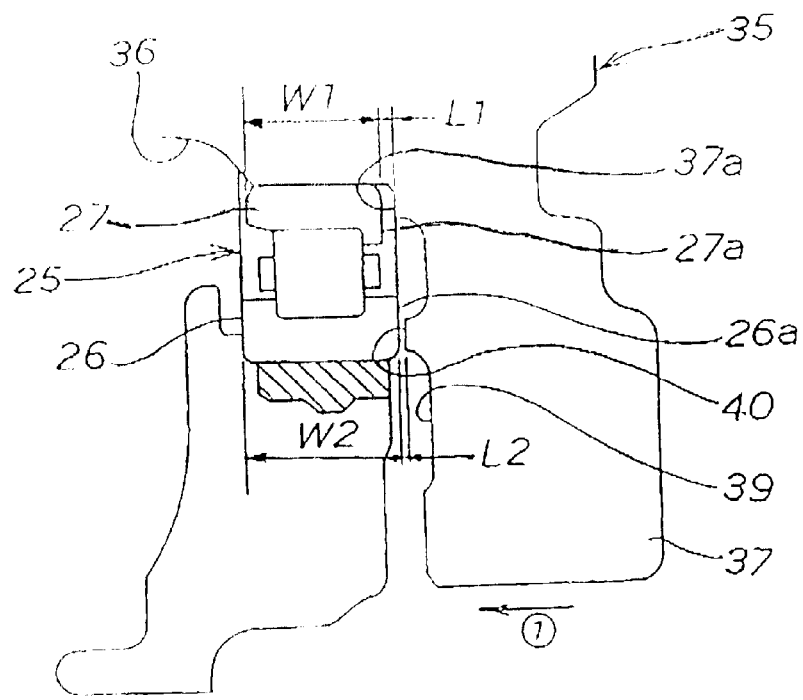
FIGS. 3(a) and 3(b) are views showing various operating positions of the crankshaft holding structure for use in an internal combustion engine according to an embodiment of the present invention.
Figure 3B:
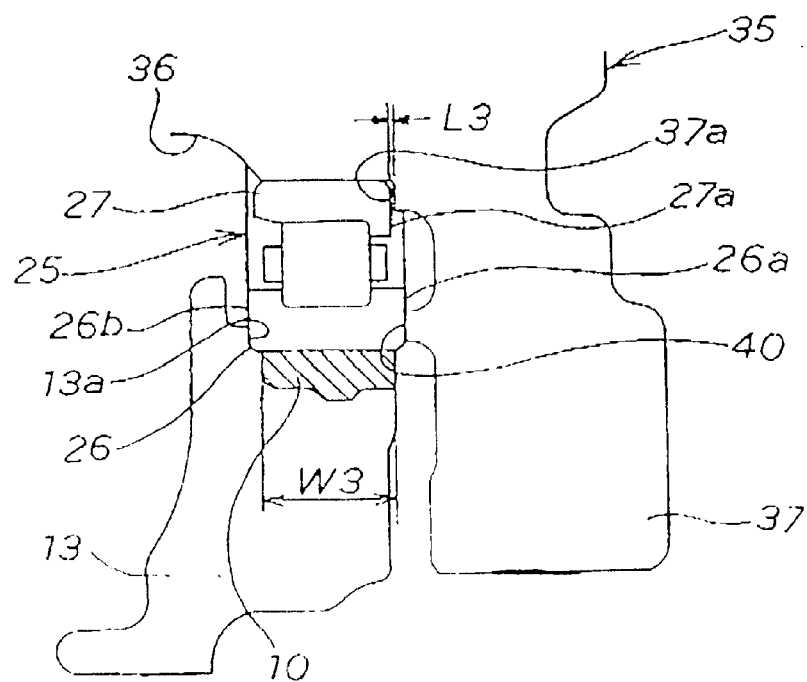
Figure 4:
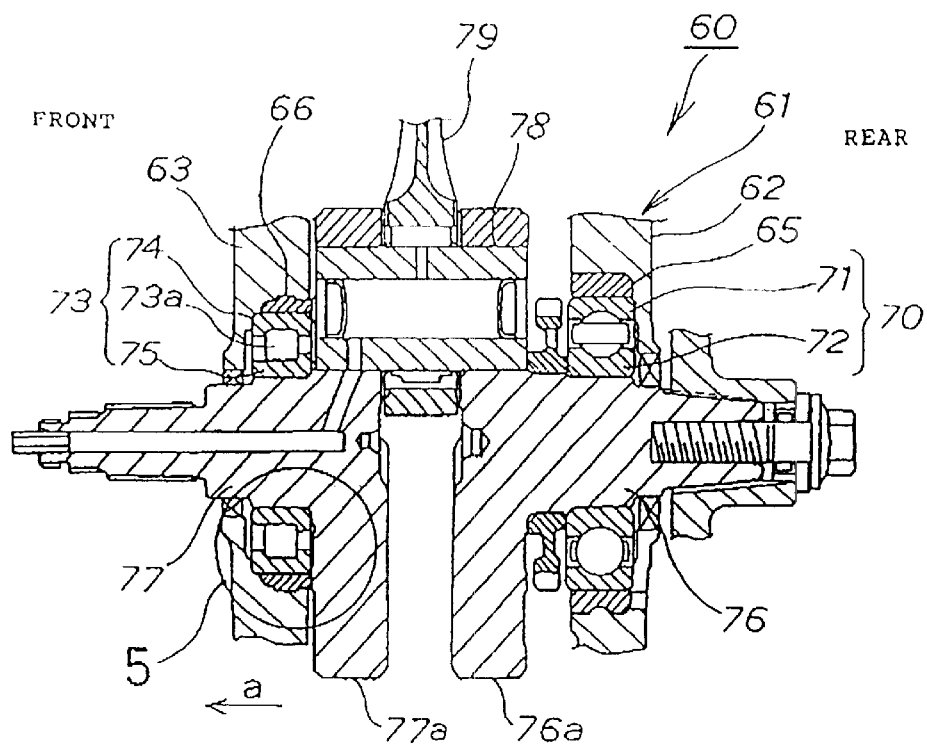
FIG. 4 is a cross-sectional view of a conventional crankshaft holding structure for use in an internal combustion engine.
Figure 5:
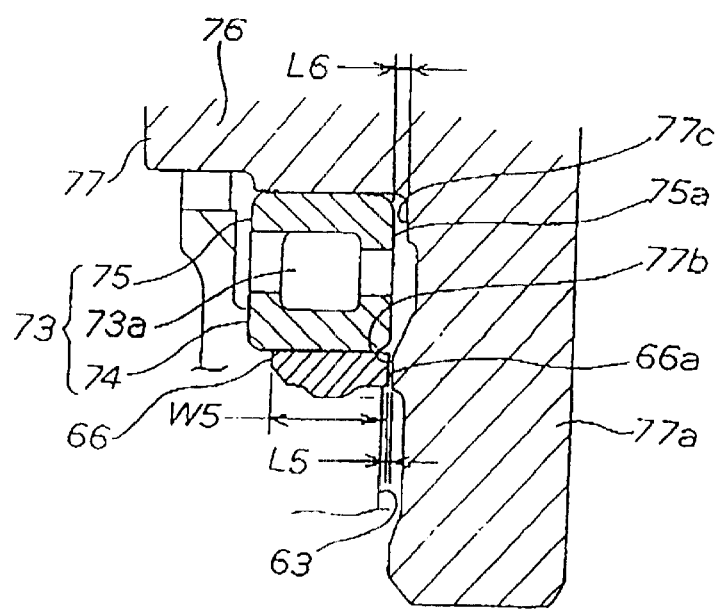
FIG. 5 is an enlarged view of the encircled area 5 in FIG. 4.

FIGS. 3(a) and 3(b) are views showing various operating positions of the crankshaft holding structure for use in an internal combustion engine according to an embodiment of the present invention. In the drawings, the terms "front" and "rear" are used to indicate front and rear sides of the structure.

As seen in FIG. 1, a crankshaft holding structure 10 for use in an internal combustion engine has a rear bushing 15 of cast iron that is cast in a rear wall 12 (shown in the rear side in FIG. 1) of a crankcase 11. A radial ball bearing 20 has an outer race 21 press-fitted in the rear bushing 15 and an inner race 22 with a rear crankshaft 30 press-fitted therein.

The crankshaft holding structure 10 also has a front bushing 16 of cast iron that is cast in a front wall 13 (shown in the front side in FIG. 1) of the crankcase 11. A radial ball bearing 25 has an outer race 26 press-fitted in the front bushing 16 and an inner race 27 with a front crankshaft 35 clearance-fitted therein. A connecting rod 45 is coupled by a connecting rod pin 43 to the crankshafts 30, 35.

In the crankshaft holding structure 10, a crankshaft side surface (a projecting face of the front crankshaft 35) 40 is held in abutment against an outer race side surface (an inner surface of the outer race 26) 26a of the radial roller bearing 25. The radial roller bearing 25 is fixed to the crankcase 11 for limiting axial elongation and deformation of the crankshafts 30, 35. The radial roller bearing 25 has an outside diameter D1 that is the same as the outside diameter of the radial ball bearing 20.

The crankshaft holding structure 10 has a one-way clutch 50 and gears 51, 52 mounted on the rear crankshaft 30, and sprockets 53, 54 mounted on the front crankshaft 35.

The gear 51 is coupled to a starter, and the gear 52 is coupled to a balancer. The sprocket 53 is operatively coupled to a valve operating cam by a chain 55, and the sprocket 54 is operatively coupled to an oil pump by a chain 56.

The rear crankshaft 30 comprises a rear shaft portion 31 interference-fitted in the inner race 22 of the radial ball bearing 20, and a rear counterweight 32 mounted on a distal end of the rear shaft portion 31. The rear counterweight 32 has an insertion hole 33 defined therein with the connecting rod pin 43 inserted therein.

The term "interference fit" refers to a fit in which interference occurs at all times when the rear shaft portion 31 is pressed-fitted in the inner race 22.

The front crankshaft 35 includes a front shaft portion 36 clearance-fitted in the inner race 27 of the radial roller bearing 25, and a front counterweight 37 mounted on a distal end of the front shaft portion 36. The front counterweight 37 has an insertion hole 38 defined therein with the connecting rod pin 43 inserted therein.

The term "clearance fit" refers to a fit in which clearance is created between the inner race 27 and the front shaft portion 36 when the front shaft portion 36 is press-fitted in the inner race 27.

The connecting rod pin 43 has both of its ends press-fitted respectively in the insertion holes 33, 38 in the rear counterweight 32 and the front counterweight 37. The connecting rod 45 has a proximal end rotatably coupled to a central portion of the connecting rod pin 43 by a radial needle roller bearing 46. A piston (not shown) is coupled to a distal end of the connecting rod 45 by a piston pin.

When the piston reciprocally moves in a cylinder, the rear crankshaft 30 and the front crankshaft 35 rotate about their own axes in unison with each other. At this time, the rear crankshaft 30 and the front crankshaft 35 axially expand by the heat that is generated during the operation of the crankshafts. Since the front shaft portion 36 of the front crankshaft 35 is clearance-fitted in the inner race 27 of the radial roller bearing 25, axial elongation and deformation due to the thermal expansion of the rear crankshaft 30 and the front crankshaft 35 can be accomodated in the forward direction.

Radial ball bearing 20 includes an outer race 21 press-fitted in the rear bushing 15, an inner race 22 press-fitted over the rear crankshaft 30, a plurality of balls 23 (only two balls shown in cross sectional view of FIG. 1) disposed between the outer race 21 and the inner race 22, and a retainer 24 disposed between the outer race 21 and the inner race 22 for retaining the balls 23 in position.

The outer race 21 has an outside diameter D1 and the inner race 22 has an inside diameter D2.

The radial roller bearing 25 includes an outer race 26 press-fitted in the front bushing 16, an inner race 27 clearance-fitted over the front crankshaft 35, a plurality of rollers 28 (only two rollers shown in cross sectional view of FIG. 1) disposed between the outer race 26 and the inner race 27, and a retainer 29 disposed between the outer race 26 and the inner race 27 for retaining the rollers 28 in position.

The outer race 26 has the outside diameter D1 and the inner race 27 has the inside diameter D3.

Since the outer race 22 of the radial ball bearing 20 has the outside diameter D1 and the outer race 26 of the radial roller bearing 25 also has the outside diameter D1, the rear bushing 15 and the front bushing 16 may have the same inside diameter.

Accordingly, the rear bushing 15 and the front bushing 16 may be used as common parts. Consequently, it is possible to lower the cost of the rear bushing 15 and the front bushing 16. When these bushings are used as common parts, it is not necessary to manage many types of bushings and spare or replacement parts management is simplified.

The inner race 27 of the radial roller bearing 25 has a width W1 (see also FIG. 3(a)) set to a value smaller than a width W2 (see also FIG. 3(a)) of the outer race 26. With this width setting, an inner side surface 27a of the inner race 27 may be positioned inwardly with respect to an inner side surface 26a of the outer race 26. Therefore, the distance L1 between the inner side surface 27a of the inner race 27 and a stepped wall surface 37a of the front counterweight 37 may be set to a relatively large value.

The front counterweight 37 has an outer side surface 39 including a land 40 positioned facing the inner side surface 26a of the outer race 26. The distance L2 between the inner side surface 26a of the outer race 26 and the land 40 is set to a value smaller than the distance L1. The reason for the setting of the distance L2 will be described in detail with reference to FIG. 3.

The rear bushing 15 includes an annular member in which the outer race 22 of the radial ball bearing 20 is press-fitted, and has a width W3. The front bushing 16 includes an annular member in which the outer race 26 of the radial roller bearing 25 is press-fitted, and has the width W3.

Since the outer race 22 of the radial ball bearing 20 and the outer race 26 of the radial roller bearing 25 have the outside diameter D1, the bushings 15, 16 may have the same inside diameter. Therefore, the rear bushing 15 and the front bushing 16 can be used as common parts.

FIG. 2 is a cross-sectional view taken along line 2—2 of FIG. 1. In FIG. 2, the land 40, which is substantially annular in shape, (shown in a mesh pattern) is disposed on the outer side surface 39 of the front counterweight 37 of the front crankshaft 35 coaxially with the front shaft portion 36. The annular land 40 has an outside diameter D4 and an inside diameter d1. The land 40 has a recess 41 defined in a lower portion thereof and a recess 42 defined in an upper portion thereof along the outer circumference of the connecting rod pin 43.

Since the land 40 is substantially annular in shape, when the rear crankshaft 30 (see FIG. 1) and the front crankshaft 35 are thermally expanded, the land 40 can be brought into uniform abutment against the inner side surface 26a (see FIG. 1) of the outer race 26. Consequently, the front crankshaft 35 is prevented from being displaced.

Operation of the crankshaft holding structure 10 for use in an internal combustion engine will be described hereinafter.

FIGS. 3(a) and 3(b) are views illustrative of the manner in which the crankshaft holding structure 10 operates. FIG. 3(a) is an enlarged view of an encircled area 3 in FIG. 1, showing the assembly before it is thermally expanded. FIG. 3(b) shows the assembly after it is thermally expanded.

In FIG. 3(a), the distance between the stepped wall surface 37a of the front counterweight 37 and the inner side surface 27a of the inner race 27 is represented by L1. The distance between the land 40 and the inner side surface 26a of the outer race 26 is represented by L2. The distances L1, L2 satisfy the relationship: L1>L2.

When the piston reciprocally moves in a cylinder, the rear crankshaft 30 (see FIG. 1) and the front crankshaft 35 are thermally expanded. Since the front shaft portion 36 of the front crankshaft 35 is clearance-fitted in the inner race 27 of the radial roller bearing 25, the rear crankshaft 30 and the front crankshaft 35 are elongated as indicated by the arrow "1."

The thermal expansion of the rear crankshaft 30 and the front crankshaft 35 is released in a forward direction, i.e., toward the radial roller bearing 25, moving the front counterweight 37 as indicated by the arrow "1."

In FIG. 3(b), when the land 40 abuts against the inner side surface 26a of the outer race 26 of the radial roller bearing 25, the rear crankshaft 30 and the front crankshaft 35 are limited against further axial elongation and deformation. Since the outer side surface 26b of the outer race 26 is held in contact with a stepped wall surface 13a of the front wall 13, the outer race 26 can be held in position even when land 40 is brought into abutment against the inner side surface 26a of the outer race 26.

The distance between the stepped wall surface 37a of the front counterweight 37 and the inner side surface 27a of the inner race 27 can be kept at L3. Since no axial pressing forces are applied to the inner side surface 27a of the inner race 27, the inner race 27 is not displaced out of position.

Since the inner side surface 26a of the outer race 26 is already flat, it is not necessary to machine the inner side surface 26a to a flat finish.

In addition, it is not necessary to project the end face of the front bushing 16 inwardly from the front wall 13 and machine the projecting end face to a flat finish. Thus, the width W3 of the front bushing 16 can be equalized to the width of the rear bushing 15 (shown in FIG. 1). Furthermore, since the inside diameters of the rear bushing 15 and the front bushing 16 can be equalized to each other, the rear bushing 15 and the front bushing 16 can be used as common parts.

In the above embodiment, the crankshafts 30, 35 of the internal combustion engine are supported by two bearings, i.e., the radial ball bearing 20 and the radial roller bearing 25. However, the present invention is not limited to the use of two bearings.

While a single-cylinder engine has been described as the internal combustion engine, the present invention is not limited to such a single-cylinder engine, but is also applicable to a multi-cylinder engine such as a four-cylinder engine.

The rear crankshaft 30 is illustrated as being supported by the radial ball bearing 20. However, the rear crankshaft 30 may be supported by a radial roller bearing in place of the radial ball bearing 20.

With the above arrangement, the present invention offers the following advantages. The side surface of the crankshaft is held in abutment against the side surface of the outer race of the radial roller bearing, thereby limiting further axial elongation and deformation of the crankshaft. The outer face of the radial roller bearing is mounted on the crankcase so as not to be axially displaced when the side surface of the crankshaft abuts against the outer face of the radial roller bearing. Therefore, rollers of the radial roller bearing, for example, are prevented from being locally worn.

The side surface of the outer race against which the side surface of the crankshaft abuts is machined to a flat finish in advance. Therefore, any process of subsequently machining the side surface of the outer race to a flat finish can be dispensed with. In addition, because the radial roller bearing is press-fitted in the crankcase while being positioned highly accurately, the management of the dimensions of the side surface of the outer race is simplified. Therefore, the cost of the crankshaft holding structure can be reduced.

Furthermore, since the side surface of the crankshaft is held in abutment against the side surface of the outer race, it is not necessary to hold the side surface of the crankshaft in abutment against an end face of a bushing in which the radial roller bearing would be press-fitted, as is the case with the conventional structure. Consequently, it is not necessary to project the end face of such a bushing and machine the projecting end face to a flat finish. Thus, the cost of the bushing can be further reduced.

When the outside diameters of the bearings are identical to the outside diameters of the remaining radial roller bearings, the bushings in which the bearings are press-fitted can have the same inside diameters. Accordingly, the bushings can be used as common parts and inventories can be more easily managed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A crankshaft holding structure for an internal combustion engine, the crankshaft holding structure comprising:
    a crankcase;
    a plurality of bearings including at least one radial roller bearing having an outer race, said outer race fixed to said crankcase; and
    a crankshaft having a side surface, said side surface of the crankshaft abutting against a side surface of the outer race of the radial roller bearing and limiting an axial elongation and a deformation of the crankshaft; wherein said crankshaft includes a first crankshaft and a second crankshaft, said first crankshaft having a projection extending from a side surface of said first crankshaft, said projection engaging said outer race of said radial roller bearing in a laterally extended position.

2. The crankshaft holding structure according to claim 1, wherein said plurality of bearings includes a second radial roller bearing.

3. The crankshaft holding structure according to claim 1, wherein said plurality of bearings includes a second bearing, said radial roller bearing having an outside diameter equal to an outside diameter of the second bearing.

4. The crankshaft holding structure according to claim 3, wherein said second bearing is a radial roller bearing.

5. The crankshaft holding structure according to claim 3, wherein said second bearing is a radial ball bearing.

6. The crankshaft holding structure according to claim 3, further comprising a plurality of bushings, said bearings press-fitted within said bushings.

7. The crankshaft holding structure according to claim 6, wherein each of said bushings has a respective inner diameter and a respective outer diameter, and said inner diameters of each bushing are substantially equal.

8. A crankshaft holding structure for an internal combustion engine, the crankshaft holding structure comprising:
    a crankcase;
    a plurality of bushings having respective inner diameters, wherein said inner diameters of said bushings are equal;
    a plurality of bearings including at least one radial roller bearing having an outer race, said outer race press-fitted within a first bushing fixed to said crankcase; and
    a crankshaft having a first side surface and second side surface, said first side surface of the crankshaft abutting against a side surface of the outer race of the radial roller bearing and limiting an axial elongation and a deformation of the crankshaft; wherein said crankshaft includes a first crankshaft and a second crankshaft, said first crankshaft having a projection extending from a side surface of said first crankshaft and said second crankshaft being press-fitted within an inner race of a second bearing and forms an interference fit.

9. The crankshaft holding structure according to claim 8, wherein said first side surface of said crankshaft is press-fitted within an inner race of said radial roller bearing.

10. The crankshaft holding structure according to claim 8, wherein said first crankshaft is press-fitted within an inner race of said radial roller bearing.

11. The crankshaft holding structure according to claim 8, wherein said plurality of bearings includes a radial ball bearing.

12. The crankshaft holding structure according to claim 11, wherein said radial ball bearing and said radial roller bearing each have an outer diameter, and said outer diameters of said bearings are equal.

13. The crankshaft holding structure according to claim 8, wherein said plurality of bearings includes a second radial roller bearing.

14. The crankshaft holding structure according to claim 13, wherein said radial roller bearing each have an outer diameter, and said outer diameters of said bearings are equal.

* * * * *